Jan. 19, 1954     G. B. HILL     2,666,672
FORAGE BLOWER

Filed Feb. 16, 1952     4 Sheets-Sheet 1

INVENTOR.
GEORGE B. HILL.
BY Alden D. Redfield
Warren Kunz.
ATTORNEYS.

Jan. 19, 1954          G. B. HILL                    2,666,672
                      FORAGE BLOWER
Filed Feb. 16, 1952                           4 Sheets-Sheet 2

INVENTOR.
GEORGE B. HILL.
BY Alden D. Redfield
   Warren Kunz.
ATTORNEYS.

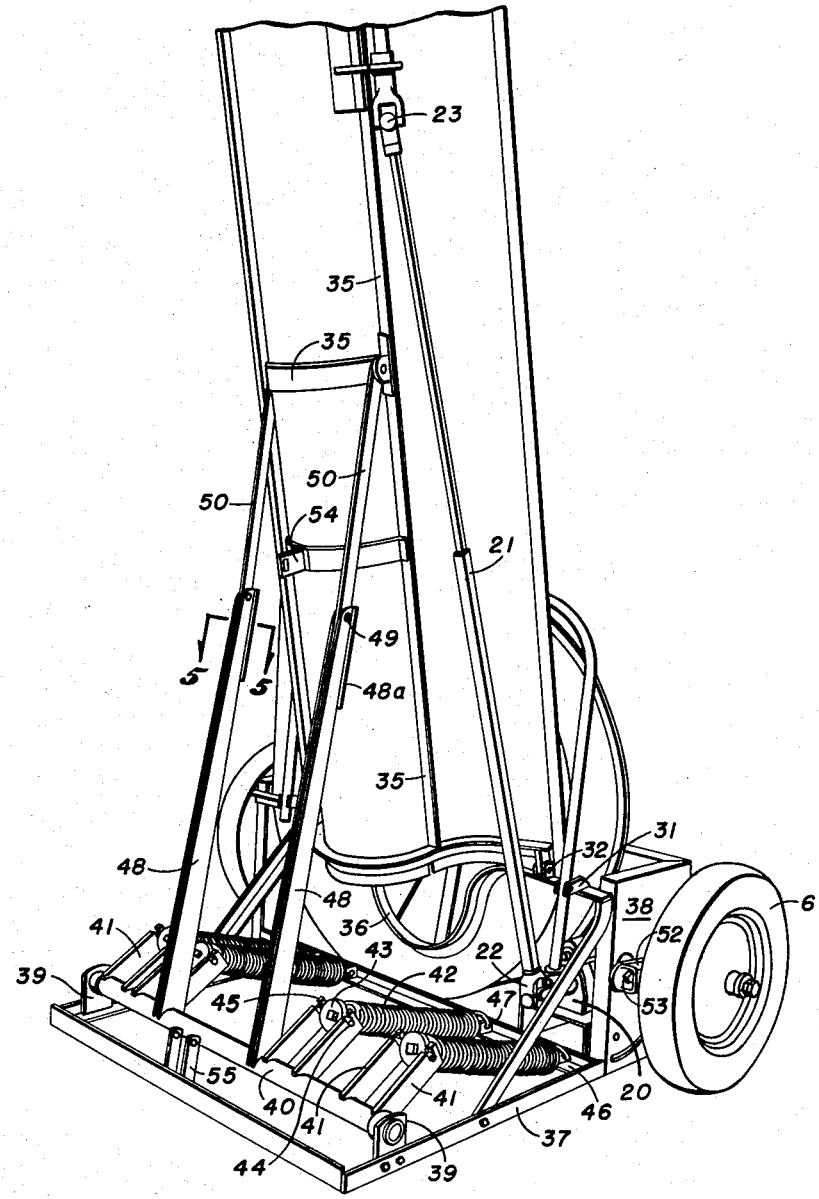

Jan. 19, 1954    G. B. HILL    2,666,672
FORAGE BLOWER
Filed Feb. 16, 1952    4 Sheets-Sheet 4
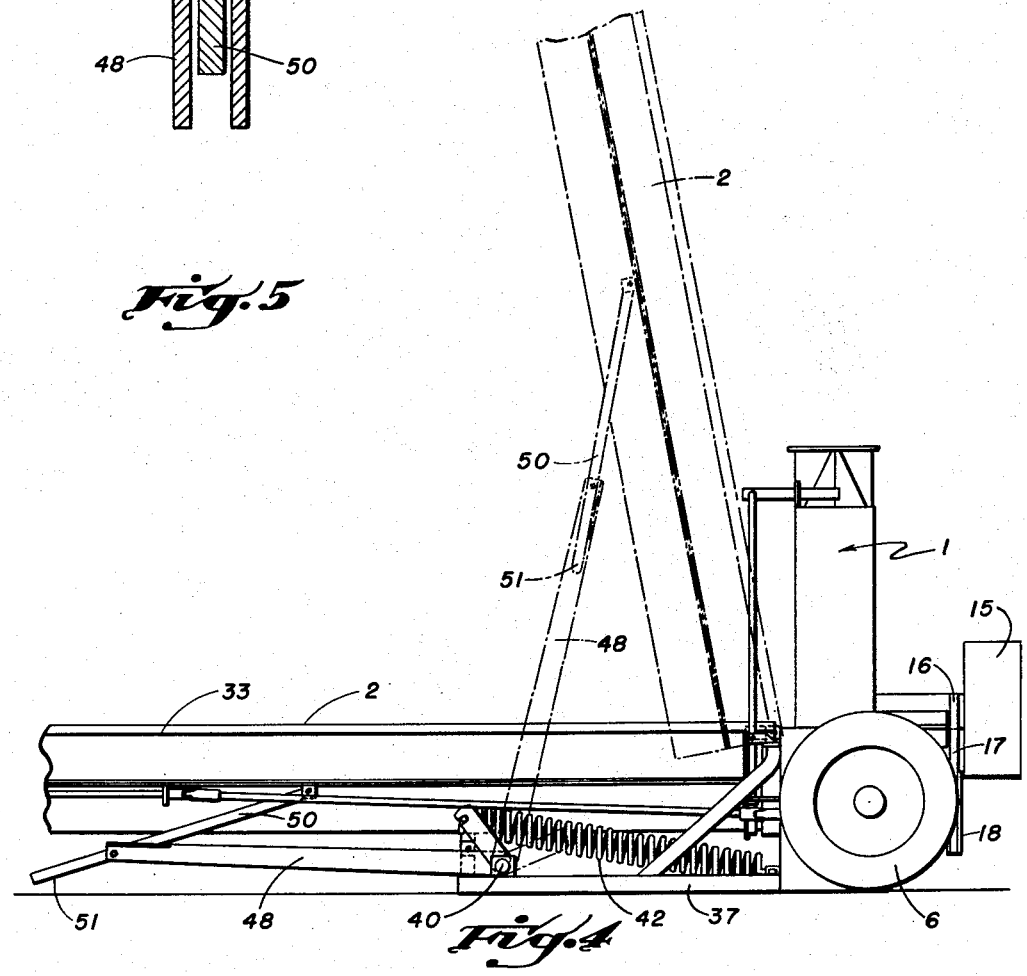
INVENTOR.
GEORGE B. HILL.
BY Alden D. Redfield
Warren Kunz
ATTORNEYS.

Patented Jan. 19, 1954

2,666,672

UNITED STATES PATENT OFFICE 2,666,672

FORAGE BLOWER

George B. Hill, Celina, Ohio, assignor to Avco Manufacturing Corporation, Cincinnati, Ohio, a corporation of Delaware Application August 16, 1952, Serial No. 304,821

9 Claims. (Cl. 302—37)

The present invention relates broadly to an agricultural implement and, more specifically, to a forage blower used for blowing forage into a silo.

Broadly considered, forage blowers are old in the art and traditionally include a blowing unit and a feed unit for supplying forage to the blowing unit. Usually the blowing unit includes a driven rotary impeller which imparts a high velocity to the forage which travels through a length of pipe extending into the top of a silo.

The forage is usually brought from the field in a large wagon and the wagon is unloaded from its rear into the feed unit. It is often difficult to handle such a wagon with any degree of accuracy, particularly when the wagon must be backed into a predetermined position. It is for this reason that the practice has evolved of building the forage blower with a hinged feed unit so that it may be swung to a vertical position and the wagon pulled forwardly into position, after which the feed unit can be lowered into a receiving position behind the wagon. It is to this class of equipment that my present invention relates although my invention goes beyond prior instrumentalities and provides a structure having several basic improvements.

Briefly stated, my invention comprehends the provision of a forage blower including a power driven blowing unit and a feed trough hingedly secured to the blowing unit. Between the blowing unit and trough there is provided a linkage system which guides the trough during its raising and lowering movements and securely holds the trough in its elevated position. Cooperating with the linkage system are springs which store energy when the trough is lowered into its position of use, the springs acting as counterbalancing means and aiding in raising the trough when it is raised into its elevated position.

Another aspect of my invention is its construction and arrangement whereby the feed trough itself is used as a draft member to facilitate and make possible transport of the forage blower from place to place. In many prior art devices, transportability was obtained through the provision of a separate draft tongue which had to be attached and detached from the blower each time it was to be moved to a new location. In other prior art devices, means had to be provided for swinging the draft hitch out of the way so that it did not impede passage of the forage wagon when the feed trough was in its elevated position. By virtue of my invention, these prior art difficulties are eliminated since the feed trough itself is used as the draft tongue.

In view of the foregoing, a particular object and advantage of my invention is the provision of a forage blower which is provided with an articulated linkage system for guiding the feed trough during raising and lowering movements.

Another object of my invention is the provision of an improved counterbalancing system which not only facilitates raising and lowering of the trough, but also is simple, durable, and economical to construct.

A particularly important object of my invention is the provision of an articulated linkage system for a forage blower which has an over-center locked position for holding the feed trough securely when elevated, thereby precluding accidental dropping of the trough.

A specific object of the invention is to provide a linkage system which lends substantial lateral support to the feed trough when it is in its elevated position. Further, it is an object to provide a linkage system which is always in positive pivotal enngagement with the trough and blowing unit thereby precluding displacement of the links relative to the trough, which happens in certain prior art devices.

Another advantage of the invention is the arrangement of the links at either side of the trough providing increased ground clearance beneath the trough.

Still another object of my invention is to provide a portable forage blower in which the feed trough itself acts as a draft member which can be quickly and easily connected to the forage blowing unit and a tractor, or other draft device, for movement of the blower from place to place.

The novel features that I consider characteristic of my invention are set forth in the appended claims; the invention itself, however, both as to its organization and method of operation, together with additional objects and advantages thereof, will best be understood from the following description of a specific embodiment when taken in conjunction with the accompanying drawings, in which:

Figure 3 is a fragmentary perspective view of the forage blower with the feed trough in a fully elevated position and the associated linkage system in an overcenter locked position;

Figure 4 shows, in full lines, a side elevational view of a portion of the forage blower with the feed trough in its lowered position of use, the trough also being shown in phantom lines in its elevated position, with the linkage in its over-center locked position; and Figure 5 is a fragmentary cross-sectional view taken on plane 5—5 of Figure 3 showing the structural relation of the linkage system when in overcenter locked position.

Figure 1:
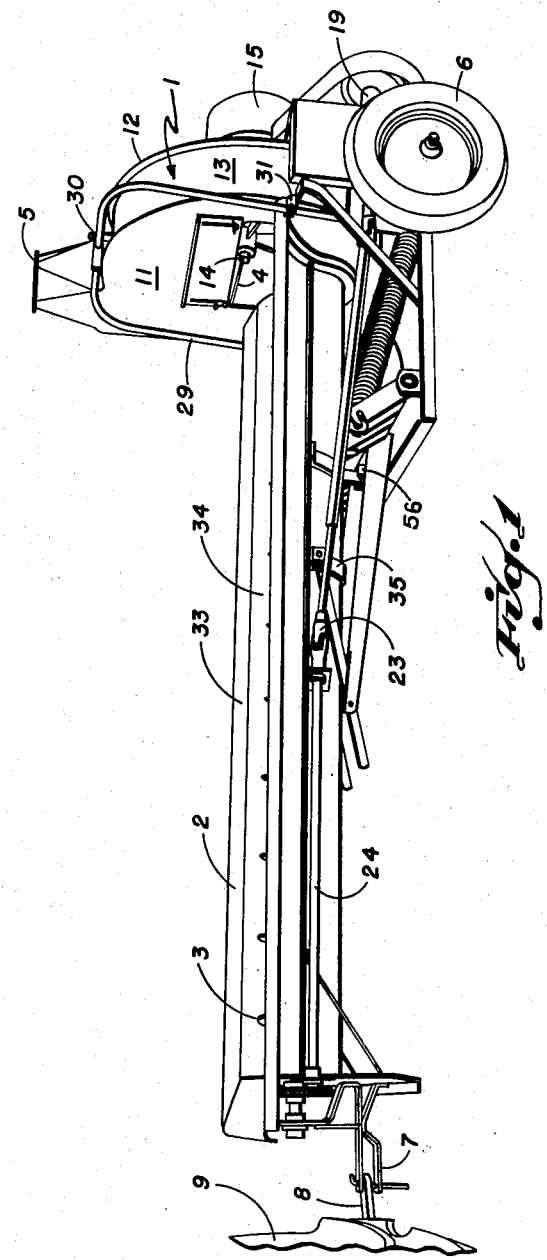
Figure 1 is a perspective view of the forage blower attached to a draft means for transportation from place to place.
Figure 2:
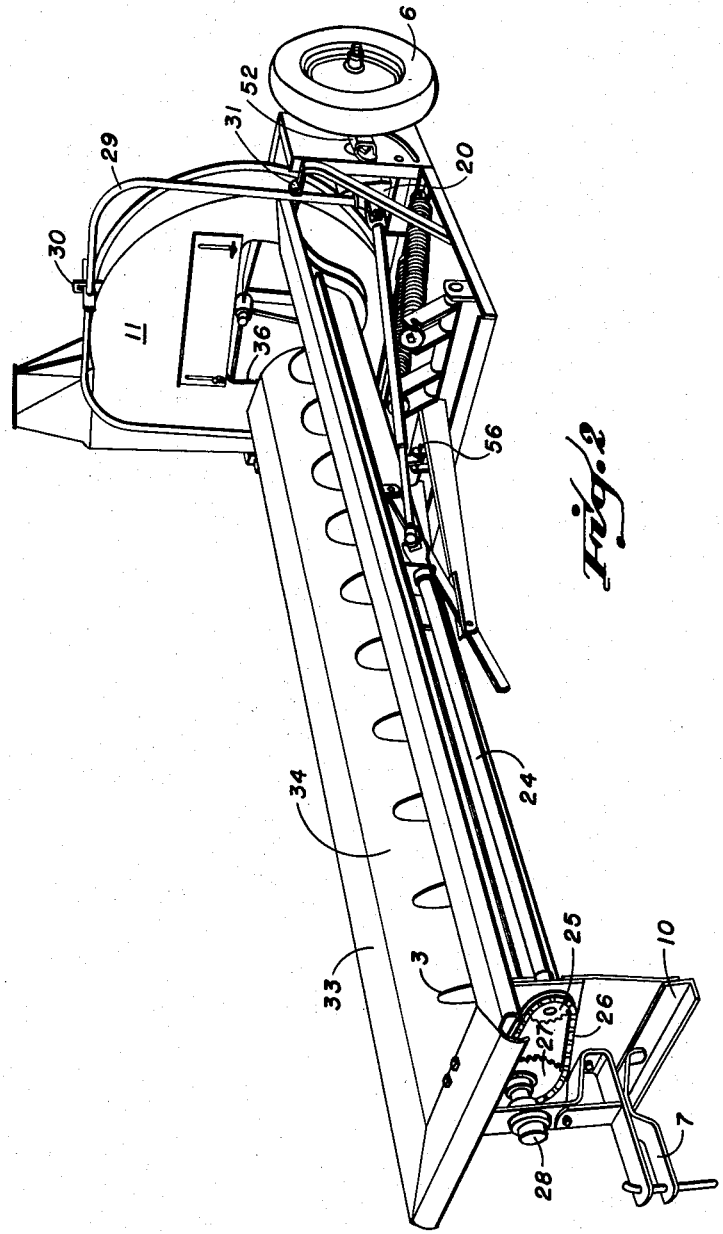
Figure 2 is a perspective view of the forage blower in its position of use, the view being taken from an elevated vantage point so as to show the location of an auger in the feed trough with relation to the forage blowing unit.

With particular reference to Figures 1 and 2, it will be noted that my forage blower consists broadly of a power driven forage blowing unit, generally designated 1, from which projects a feed through 2 in which is operatively disposed an auger 3 which is power driven to feed forage material to an impeller 4 rotatably supported within the forage blowing unit 1. The forage material is fed by auger 3 to impeller 4 which imparts a high velocity to it before it leaves the blowing unit through flanged outlets 5 to which may be secured a length of pipe (not shown) for conveying the forage material to a silo, or other receptacle.

The forage blower is shown in Figure 1 in its portable condition with ground wheels 6 lowered for ground engagement and hitch 7 releasably engaged to a draft bar 8 of a tractor or other draft means 9. The blower is shown in Figure 2 in its position of use in which ground wheels 6 are swung upwardly so that the forage blowing unit rests squarely on the ground. Hitch 7 has been disconnected from the draft means, and the outstanding end of the feed trough is supported by pedestal 10 which also rests on the ground.

Drive for forage blowing unit and auger

Considering the structural arrangement of the unit in greater detail, it will be noted that the forage blowing unit includes side plates 11 and 12 with an annular facing 13 which cooperates with the side plates in defining a scroll-type housing around impeller 4. The impeller is secured to shaft 14 to which is also secured a drum type pulley 15 which may be driven by a belt (not shown) driven by any power source, such as a farm tractor, electric motor, or gasoline engine.

With reference to Figure 4, it will be noted that a small auxiliary pulley 16 is secured for conjoint rotation to shaft 14. A V-belt 17 is engaged with pulley 16 and also with another pulley 18, the latter pulley being secured to a lay shaft 19 located at one side of the forage blowing unit. Shaft 19 delivers power through jaw clutch 20 (Figures 2 and 3) to a telescopic shaft 21 having universal joints 22 and 23 at its ends. From joint 23 the power is transferred to shaft 24 rotatably secured to one side of the feed trough. A sprocket 25 is secured for conjoint rotation to the forward end of shaft 24 (see Figure 2). A drive chain 26 transfers the driving action from sprocket 25 to another sprocket 27 which is secured to a shaft 28 to which auger 3 is also secured.

A clutch control handle 29, with a ratchet type latch 30, is pivotally secured, as at 31, on the forage blowing unit (Figures 1 and 2). Movement of the clutch control handle 29 back and forth relative to the blowing unit engages and disengages the jaw clutch 20 thereby effectively engaging and disengaging auger 3 from the power drive.

Linkage system for guiding and supporting feed trough

As shown particularly well in Figure 3, the feed trough is pivotally secured to the blowing unit at transverse pivot points 32 and may be raised and lowered between its horizontal and elevated positions, illustrated in full and phantom lines, respectively, in Figure 4.

The feed trough itself is made from sheet metal and has flared sideboards 33 which blend integrally into a semi-cylindrical central portion 34 in which auger 3 is located. Reinforcing members 35 are provided beneath the feed trough to strengthen it so that it may be raised and lowered as a unit without distortion or damage. The semi-cylindrical portion 34 corresponds in shape to a feed opening 36 (see Figures 2 and 3) which is formed in side plate 11 of the forage blowing unit. As the feed trough is swung about pivot points 32, it is brought into and out of registry with opening 36.

The forage blowing unit 1 is secured to a rigid framework 37 which includes side panels 38 to which the ground wheels 6 are pivotally secured, as will be explained more fully hereinafter. To the forward portion of the framework, a pair of bearing plates 39 are secured in position to rotatably support a transverse shaft 40. To this shaft there is affixed a plurality of short outstanding arms 41, the arms being arranged in pairs, as illustrated in Figure 3, each pair cooperating with a coil type tension spring 42, four springs being provided in the preferred embodiment. Each spring is provided with an anchor cap 43 which includes a pair of trunnions 44 confined in slots 45 formed in the outstanding arms 41. The other end of each spring 42 is secured to a rigid transverse frame member 46, as at 47.

A pair of parallel elongated levers 48 are also secured symmetrically to shaft 40 near its central portion. These levers extend longitudinally of the feed trough at either side thereof and are joined by pivot pins 49 to a pair of links 50, the links 50 being pivotally secured, in turn, to reinforcing members 35 beneath the feed trough. The levers 48 and links 50 form an articulated linkage system which serves to guide the feed trough during its raising and lowering movements. When the feed trough is elevated, as in Figure 3, the linkage system serves to strengthen the feed trough and support it so that it has no tendency to sway sideways.

Figure 4 shows the levers 48 and links 50 in their two extreme positions. In the full line figure, these members are shown in a jack-knifed configuration, while they are shown in an extended position in phantom lines. With particular reference to this figure, it will be noted that each link 50 has an extended lower end 51 which projects within its associated lever 48. As indicated best in Figures 1, 3, and 5, each lever 48 is formed by parallel side members which define between them a U-shaped space. Ends 51 of the links 50 pass through an overcenter position when being swung to the phantom line position of Figure 4, the ends 51 eventually coming into bearing engagement with levers 48 (see Figure 5). This produces a toggle action and effectively locks the feed trough in its elevated position so that it cannot fall accidentally. In order to lower the feed trough, it is necessary to pull the levers 48, or links 50, forward slightly, carrying them overcenter and permitting movement of the trough to the full line position of Figure 4. Flanges 48a may be provided on the extended ends of levers 48 for strengthening purposes and to form hand-holds for pulling the levers overcenter.

It will be noted that shaft 40 is rotated correspondingly by the movement of levers 48. With reference to Figure 4, the shaft 40 is rotated counterclockwise when the feed trough is lowered. Outstanding arms 41 also are rotated counterclockwise, thereby stretching the storing energy within tension springs 42. The force of the springs acting on arms 41 tends to restrain the feed trough as it is lowered. On the other hand, the energy stored in the springs is returned to the system and aids in swinging levers 48 clockwise when the feed trough is raised. Thus, a counterbalancing action is obtained and very little force is required to raise or lower the feed trough.

It is important to note that the linkage system, for guiding and supporting the feed trough, is attached to the trough at all times and that there is no possibility of an accident caused by disengagement of the supporting system for the trough. It is also to be noted that there are no structural supports extending directly beneath the feed trough so that the trough, when in its lowered position, as illustrated in Figure 1, has few obstructing members beneath it, precluding interference between the structural supports and ground irregularities.

A further point of importance to be noted is the structural arrangement of the linkage system with shaft 40 and the feed trough. As illustrated particularly well in Figure 3, the linkage system, trough, and shaft form a relatively rigid parallelogram of structural elements which are particularly effective in supporting the feed trough, not only in its elevated position but in all other positions it assumes.

Transportability of forage blower

Figures 2, 3, and 4 show the forage blower with the ground wheels 6 in a relatively raised position so that the framework 37 rests squarely on the ground. With particular reference to Figures 2 and 3, it will be noted that each ground wheel is journaled on a pivoted support 52 which can be swung about pivot point 53 between the positions shown in Figures 2, 3, and 4 to a lowered position shown in Figure 1.

It will also be noted that a depending bar 54 is secured beneath the feed trough in position to pass between a pair of upstanding rigid pintle supports 55 which are designed to receive a pivot pin 56 (Figure 2) to fasten the feed trough to framework 37.

When pin 56 has been positioned in supports 55, and ground wheels 6 have been swung to their lowered position, a tractor or other draft device may be hitched to the forward end of the forage blower at 7 and it may be readily transported from place to place, as indicated in Figure 1.

It is important to note that the feed trough acts as a draft tongue and that no supplementary draft means is required. This is obviously an improvement and simplifies the design while eliminating the presence of a draft member which might otherwise have to be removed when the forage blower was placed in operation.

In view of the foregoing description, it will be obvious to those skilled in the art that I have provided a novel forage blower which represents a substantial advance in the art and one which has great utility for agricultural use.

Having described a preferred embodiment of my invention, I claim:

1. An improved forage blower comprising a forage blowing unit, a rigid framework secured to said blowing unit and extending forwardly thereof, a feed trough pivotally secured to said blowing unit above said framework for raising and lowering movement between a lowered position of use and an elevated position, a transverse shaft beneath said feed trough, bearing means on said framework for rotatably supporting said shaft, a pair of elongated parallel levers centrally and symmetrically secured to said shaft, a link pivotally attached to each lever and also pivotally attached to said feed trough, a plurality of outstanding arms secured to said shaft, tension springs secured between said arms and fixed points on said framework for storing energy while said feed trough is lowered and said shaft rotated in accordance with the corresponding movement of said levers, said links having extended ends for physical engagement with said levers, said levers and links being fully extended in substantial alignment when said feed trough is raised with the ends of said links physically engaging said levers in overcenter locked relationship.

2. In combination in a forage blower including a forage blowing unit and a feed trough pivotally secured to said blowing unit for movement between a lowered position of use and an elevated position, means for supporting and guiding said feed trough during its raising and lowering movements comprising a transverse shaft, means associated with said blowing unit for rotatably supporting said shaft, a linkage system comprising a pair of parallel levers each secured at one end to said shaft, a pair of pivoted links, each link being pivotally secured to the trough at one end and to the distal end of one of said levers at the other end, said levers being rotatable from a lowered position to a raised overcenter locked position when said feed trough is elevated, the lever-attached end of each link physically engaging its associated lever when the linkage system is in its overcenter locked position, a plurality of outstanding arms secured to said shaft, and springs extending between said arms and fixed points on the blowing unit whereby said shaft is urged to rotate said levers for raising said feed trough.

3. In a forage blower, a forage blowing unit including a rigid framework, a feed trough pivotally secured to said blowing unit and extending above a portion of said framework, a shaft rotatably supported by said framework transversely beneath said feed trough, a pair of symmetrically positioned parallel levers secured to said shaft and extending beneath said feed trough, a pair of links, each having one end pivotally attached to said feed trough and the other end pivotally attached to a lever, the lever end of the links extending within the levers and coming into bearing engagement therewith when the feed trough is raised to an extreme position whereby the levers and links are carried to an overcenter pocked position, and spring means constantly biasing said shaft to raise said feed trough.

4. A forage blower comprising a blowing unit, a framework secured to said blowing unit and extending outwardly therefrom, a feed trough pivotally secured to said blowing unit above said framework, a rotatable shaft extending transversely beneath said feed trough supported for rotation by said framework, a linkage system extending between said shaft and said trough, said linkage system comprising a pair of parallel outstanding levers secured to said shaft and a pair of pivoted links extending between the outstanding ends of said levers and said feed trough, and spring means acting on said shaft to bias it in a direction to raise said feed trough.

5. In combination in a forage blower, a forage blowing unit including a rigid framework, a feed trough pivotally attached to said blowing unit and extending outwardly therefrom above a portion of said framework, a transverse shaft rotatably supported by said framework beneath said feed trough, a lever secured to said shaft beneath said feed trough, a link pivotally secured at one end to said feed trough and at the other end to said lever, thereby constituting a linkage system which can be swung from a jack-knifed position, when the feed trough is lowered, to an overcenter position when the feed trough is raised, and spring means biasing said shaft to rotate said lever for raising said feed trough.

6. A forage blower comprising a forage blowing unit, a feed trough pivotally secured to said forage blowing unit, a framework extending from said forage blowing unit beneath said feed trough, a lever rotatably secured to said framework, a link pivotally secured at one end to said feed trough and at the other end to said lever, and spring means for biasing said lever to raise said feed trough by forces transferred thereto through said pivoted link.

7. In combination in a forage blower, a blowing unit, a feed trough pivotally attached to said blowing unit for movement between a lowered position of use and an elevated position, a lever rotatably supported by said blowing unit, a link having one end pivotally secured to said feed trough and the other end pivotally secured to said lever, and energy storage means for urging movement of said lever in a direction to raise said feed trough.

8. An improved forage blower comprising a forage blowing unit, an elongated feed trough pivotally secured to said blowing unit, a lever rotatably supported by said blowing unit adjacent said feed trough, a pivoted link interconnecting said lever and said feed trough, said lever and link guiding said feed trough for movement between a lowered position of use and a raised position, the lever and link being fully extended when said feed trough is raised, and means on said link to engage said lever in overcenter locking relationship when said feed trough is raised.

9. An improved forage blower comprising a blowing unit, a feed trough rotatably attached to said blowing unit, a lever pivotally attached to said blowing unit adjacent said feed trough, and a link pivotally interconnecting said lever and said feed trough.

GEORGE B. HILL.

References Cited in the file of this patent

UNITED STATES PATENTS

| Number | Name | Date |
|---|---|---|
| 2,180,838 | Saiberlich | Nov. 21, 1939 |
| 2,373,169 | Coultas et al. | Apr. 10, 1945 |
| 2,532,064 | Huddle | Nov. 28, 1950 |
| 2,588,711 | Everett | Mar. 11, 1952 |
| 2,591,411 | Delsman et al. | Apr. 1, 1952 |
| 2,616,765 | Hill et al. | Nov. 4, 1952 |
| 2,630,351 | Hansen | Mar. 3, 1953 |